United States Patent [19]

Whaley et al.

[11] 4,047,748
[45] Sept. 13, 1977

[54] CHASSIS LOCK FOR CONTAINER TRAILER

[75] Inventors: Robert L. Whaley; James L. Day, both of Cincinnati, Ohio

[73] Assignee: Pullman Incorporated, Chicago, Ill.

[21] Appl. No.: 691,679

[22] Filed: June 1, 1976

[51] Int. Cl.² ............................................. B62D 27/00
[52] U.S. Cl. .............................. 296/35 A; 105/366 B
[58] Field of Search ......................... 296/35 A, 35 R; 105/366; 248/361 R

[56] References Cited

U.S. PATENT DOCUMENTS

| 3,438,671 | 4/1969 | Seng | 296/35 A |
|---|---|---|---|
| 3,817,570 | 6/1974 | Connerat | 296/35 A |
| 3,924,544 | 12/1975 | Gray | 105/366 B |

Primary Examiner—Philip Goodman
Attorney, Agent, or Firm—Richard J. Myers

[57] ABSTRACT

A chassis lock to secure a container body to a trailer chassis includes a bolt comprising upper and lower telescoping sections, the upper section having a head member received in a cavity in the container body and shaped so that rotating the head bolt locks the body to the chassis. The head member is rotated through the lower portion which is vertically displaceable and lockable in two rotatably different positions by a plate welded thereto that locks into a slot in the chassis in those two positions.

13 Claims, 9 Drawing Figures

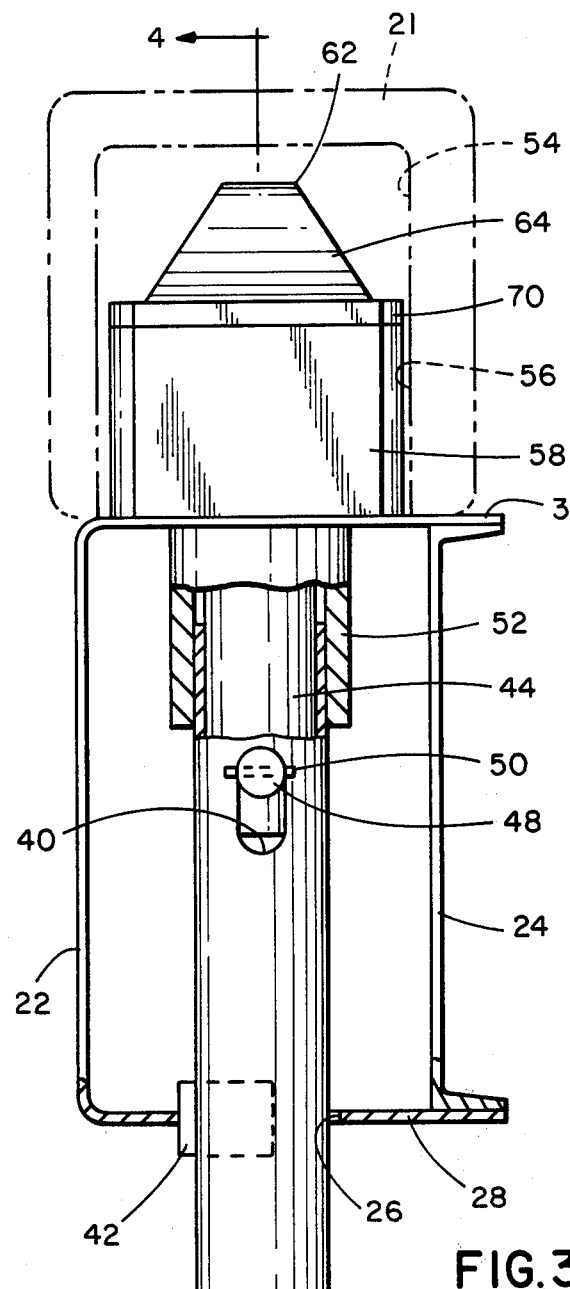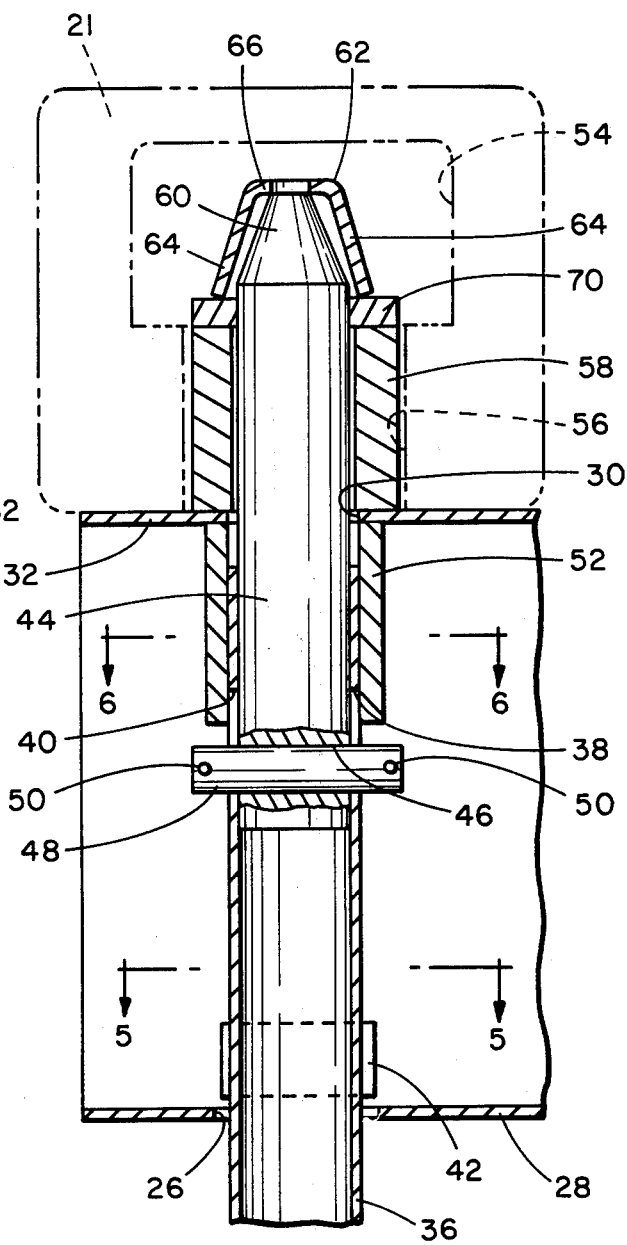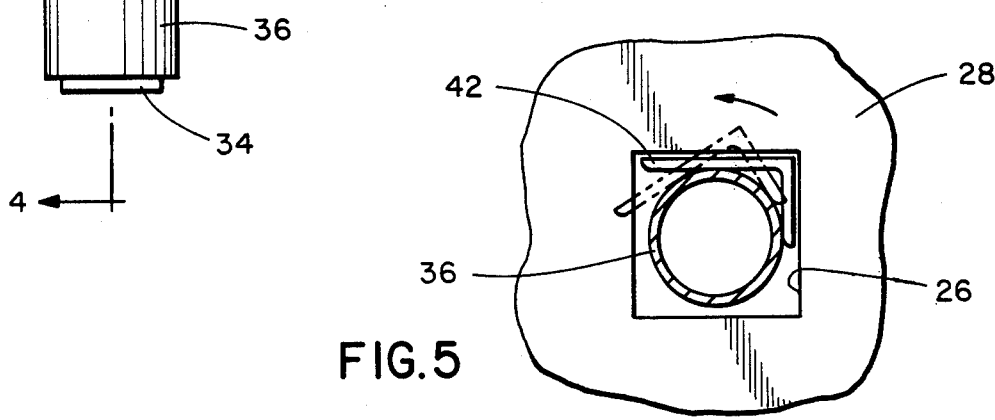
FIG.3　　FIG.4
FIG.5

CHASSIS LOCK FOR CONTAINER TRAILER

BACKGROUND OF THE INVENTION

1. Field of the Invention

The invention relates to chassis locks for securing a container body to a chassis to form a container trailer. Such locks have become necessary since the advent of containerized cargo transport which requires the transfer of containers from one mode of travel to another, i.e., from road trailer to railroad cars or ships. Such transfers are facilitated by positive tie-down locks which then allow the container trailer to be lifted as a unit by the container body.

2. Description of the Prior Art

The prior art is generally cognizant of the broad need for container body-to-chassis locks. U.S. Pat. No. 3,618,999 discloses a securement apparatus in which a locking member on a shaft is twisted to lock the container body to the chassis. U.S. Pat. No. 2,963,310 also describes a twisting container coupler. U.S. Pat. Nos. 3,331,333, 3,417,712 and 3,456,829 show other chassis locks. Pat. No. 3,521,765 describes a pallet and stacking pin arrangement including an arm traveling in parallel slots.

SUMMARY OF THE INVENTION

The invention is summarized in that a chassis lock for locking a trailer chassis to a container body having a locking cavity therein includes a handle, wall means having a striker angle slot defined therein, a sleeve fixed to said handle and extending through the striker angle slot, a striker angle plate secured to the sleeve and shaped so as to fit into the striker angle slot in at least a first and a second rotatable separated positions, a shaft extension carried at one end within the sleeve and extending at its other end into the cavity in the container body, a slip joint connecting the sleeve to the shaft extension, and a locking plate of an elongated shape carried by the shaft extension and received with the cavity in the container body such that the container body is secured to the chassis by the locking plate when the sleeve is rotated from the first position wherein the striker angle plate fits into the striker angle slot to the second position.

An object of the present invention is to provide a chassis lock providing easy operation and a positive lock between a trailer chassis and a container body.

Another object of the present invention is to construct such a lock that is easy to assemble and maintain and which contains few and simple parts to ensure reliability and maintenance-free operation.

Yet another object of the present invention is to provide such a lock that will lock itself into position using the force of gravity to positively secure the lock.

Other objects, advantages, and features of the present invention will become apparent from the following specification when taken in conjunction with the accompanying drawings.

BRIEF DESCRIPTION OF THE DRAWINGS

FIG. 3 is a side elevation partially cutaway view of the chassis lock of FIG. 2;

FIG. 4 is a section through the line 4—4 of FIG. 3;

FIG. 5 is a section through the line 5—5 of FIG. 4;

DESCRIPTION OF THE PREFERRED EMBODIMENT

Figure 1:
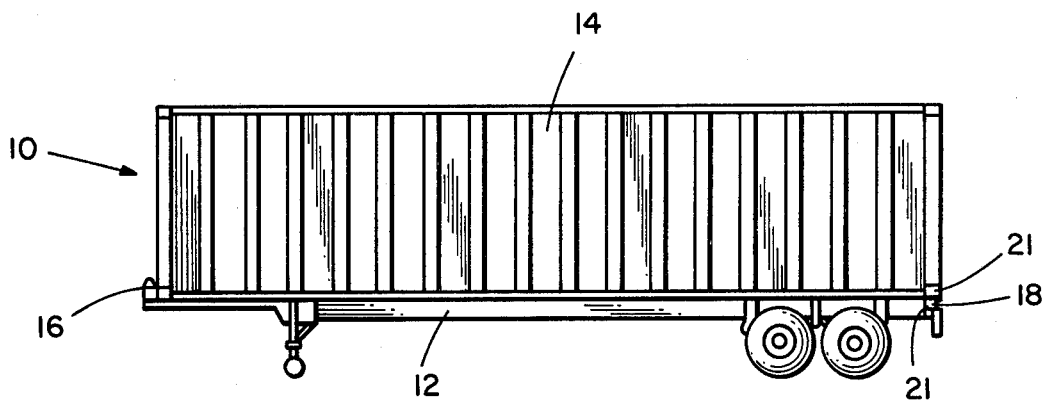
FIG. 1 is a side elevation view of a container trailer including a chassis lock according to the present invention.

As is shown in FIG. 1, the present invention is embodied in a chassis lock for a container trailer generally indicated at 10. The container trailer 10 includes a chassis frame 12 with a container body 14 mounted thereon. The container body 14 fits into a stop block 16 at the front end of the chassis frame 12 and is secured and locked onto the rear end thereof by a pair of chassis twist locks, generally indicated at 18, mounted in a rear cross-member 20 at the rear of the chassis frame 12, the chassis twist locks 18 locking into locking receptacles 21 provided in the container body 14.

Figure 2:
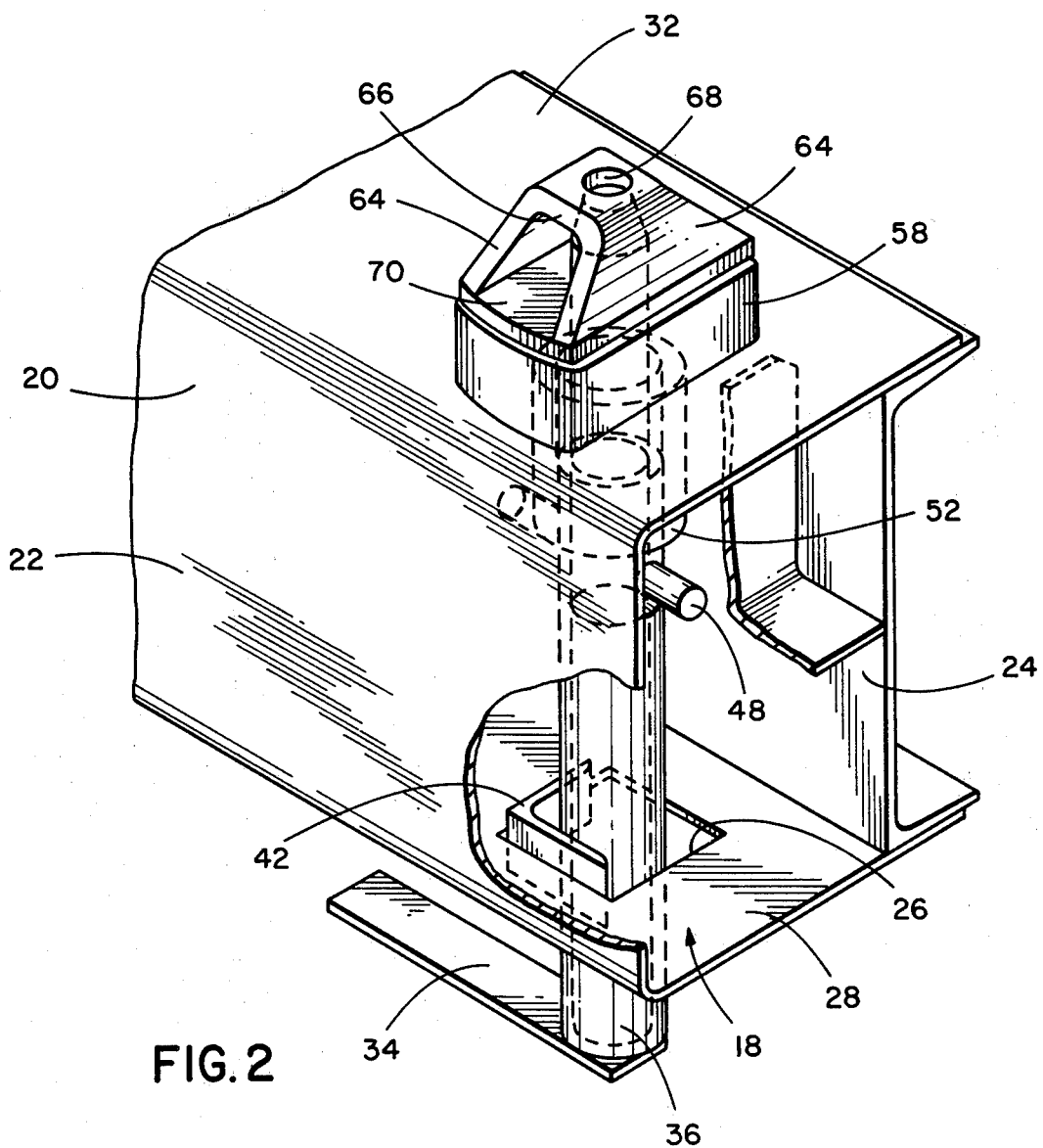
FIG. 2 is a perspective partial cut-away enlarged view of the chassis lock of FIG. 1.
Figure 6:
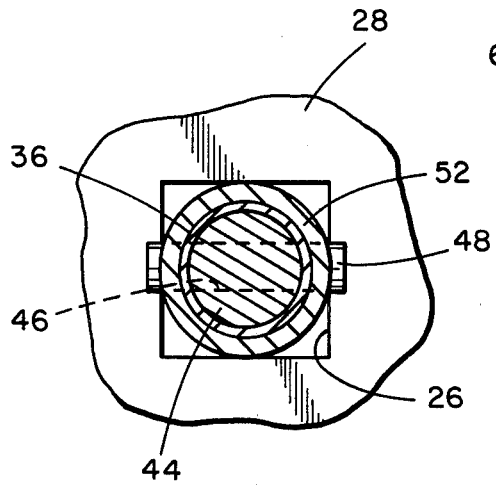
FIG. 6 is a section through the line 6—6 of FIG. 4.

Additional details of the rear cross-member 20 can be seen in FIG. 2. The rear cross-member 20 includes a box-type member 22 open at its rear end and extending across the rear of the container trailer 10 with a shallow U-shaped beam 24 secured to close the open end of the box-type member 22. A generally square striker plate slot 26 is formed in a lower horizontal side 28 of the box-type member 22 while a generally circular aperture 30 is formed in an upper horizontal side 32 of the box-type member 22.

Figure 7:
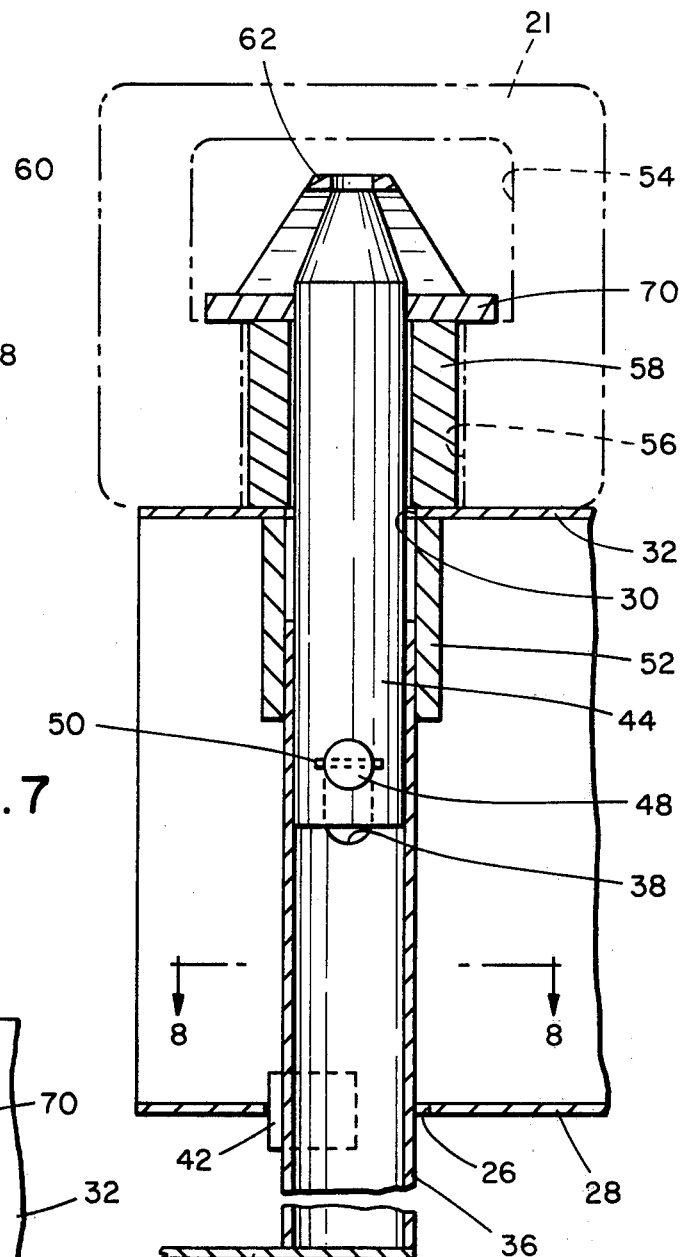
FIG. 7 is a cross-sectional view of the chassis lock in a locked position.

The chassis twist lock 18 is received within the box-type member 22 and extends through both the striker plate slot 26 and the aperture 30. A handle 34 is provided beneath the horizontal side 28 of the box-type member 22 with a slip joint sleeve 36 secured to one end of the handle 34 and extending through the striker plate slot 26 into the interior of the rear cross-member 20. The slip joint sleeve 36, as seen in FIGS. 3, 4 and 7 is of an elongated tubular shape and has formed in it a pair of vertically aligned elongated shear pin slots 38 and 40 near its upper end. A striker angle plate 42, in the form of a plate bent at a right angle as seen in FIG. 5, is welded to the slip joint sleeve 36. As best seen in FIGS. 4 and 7, a connecting shaft extension 44, in the form of a solid cylindrical rod, is received within the top portion of the slip joint sleeve 36. A horizontal bore 46 is provided through the shaft extension 44 near its lower end and a shear pin 48 is provided extending respectively through the shear pin slot 40, the bore 46 and the other shear pin slot 38. A pair of cotter pins 50 are inserted through suitable receiving means located at either end of the shear pin 48 to retain it is place. The upper end of the slip joint sleeve 36 is received within a lift bearing roller 52 welded to the lower surface of the upper side 32 of the box-type member 22.

The locking receptacle 21, as shown in broken lines in FIGS. 3, 4, 7 and 9, includes a large cavity 54 formed therewithin and a shear block slot 56 connecting the cavity 54 with the lower surface of the locking receptacle. The shear block slot 56 is of a generally elongated, rectangular, cross-section excepting that the short sides of the rectangle are arcuate surfaces curved toward the inside of the slot as can be seen best in FIG. 9.

Figure 9:
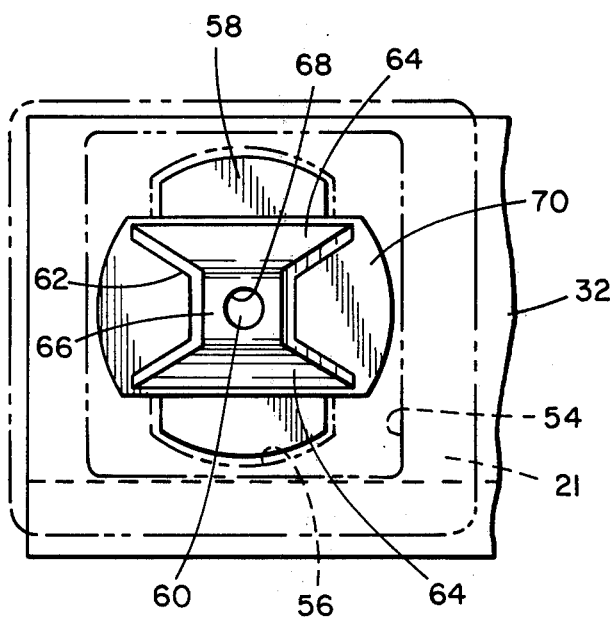
FIG. 9 is a top elevation view of the chassis lock of FIG. 7.

The upper end of the connecting shaft extension 44 extends through and is freely received within a shear block 58 rigidly mounted on the upper side 32 of the box-type member 22. The shear block 58 is of a generally elongated, rectangular, cross-section excepting that the shorter sides of the rectangle are inwardly curving arcuate surfaces, as can be seen in FIGS. 2 and 9, so that the shear block 58 can be closely received within the shear block slot 56. Above the shear block 58 a tapered portion 60 is formed on the connecting shaft extension 44. At the extreme end of the tapered portion 60 of the connecting shaft extension 44 is attached a twist lock head member 62. The head member 62 is an hour glass shaped member with a pair of downturned wings 64 connected by a neck portion 66. A welding recess 68 is formed in the neck portion 66 of the head member 62 so that it can be welded to the top of the connecting shaft extension 44. Welded to the bottom of both of the wings 64 of the head member 62 and carried between the head member 62 and the shear block 58 is a lockng base plate 70 of an elongated shape generally conforming to the cross-sectional shape of the shear block 58.

Figure 8:
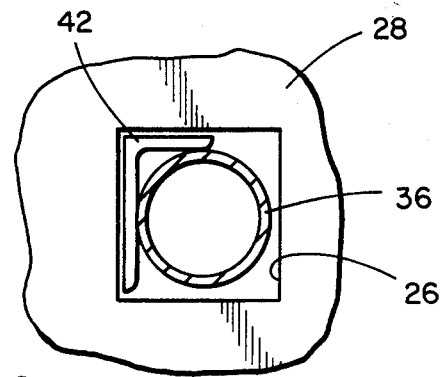
FIG. 8 is a section through the line 8—8 of FIG. 7.

In the operation of the chassis twist lock 18, the twist lock 18 is initially at the position shown in FIG. 2 and the locking receptacle 21 is lowered onto the twist lock 18 so that the shear block 58 is received i the shear block slot 56 and the head member 62 is within the cavity 54, as is shown in FIG. 3. The operation of the twist lock 18 to secure the container body 14 in place is accomplished through the use of the handle 34. The slip joint sleeve 36 is held fixed and is not free to be rotated in its position as shown in FIGS. 2 and 3 inasmuch as the striker angle plate 42, which is welded thereto, is restrained in movement by the sides of the striker angle slot 26 as is shown by the solid lines in FIG. 5. To rotate the slip joint sleeve 36, the handle 34 must be raised upward lifting the striker angle plate 42 out of the striker angle slot 26, as is shown in FIG. 4. As the handle 34 and thereby the slip joint sleeve 36 is raised the shear pin 48 remains in place and therefore travels, in effect, downward in the shear pin slots 38 and 40. After the striker angle plate 42 is free of the striker angle slot 26, the handle 34 can be rotated to turn the slip joint sleeve 36. The rotation of the slip joint sleeve 36 is transmitted by the shear pin 48, which extends through the bore 46, to the connecting shaft extension 44. The rotation of the connecting shaft extension 44 also rotates the head member 62 and the base plate 70 from their positions shown in FIGS. 2, 3 and 4. Once the striker angle plate 42 is lifted out of the striker angle slot 26 and is rotated slightly, as shown by the broken lines in FIG. 5, the lifting pressure on the handle 34 can be released allowing the slip joint sleeve 36 to fall slightly that the striker angle plate 42 rests in the lower side 28 of the box-type member 22. When the handle 34, the therethrough striker angle plate 42, have been rotated through 90° the striker angle plate 42 again fits within the striker angle slot 26 and the slip joint sleeve 36 and striker angle plate 42 fall gravitationally downward again locking the striker angle plate 42 within the striker angle slot 26 at a position rotated 90°from FIG. 5, or as shown in FIG. 8. This locks the head member 62 and the base plate 70 in overlying position to the ledge 71 on the container body in positions which are rotated 90° from the portions shown in FIG. 2, i.e., those shown in FIGS. 7 and 9. This locks the container body 14 securely to the chassis frame 12 inasmuch as the base plate 70 is now rotated 90° from the shear block slot 56 so that shear block slot 56 cannot be lifted off the twist lock 18.

To unlock the chassis twist lock 18, the sequence will be repeated except that the handle 34 would be rotated in the opposite direction. The handle 34 is lifted, lifting the striker angle plate 42 from the striker angle slot 26 and sliding the slip joint sleeve 36 upward relative to the shaft extension 44. Then the handle 34 is rotated, optionally in either direction, but preferrably in the opposite direction from the locking movement. After a slight rotation the lifting force on the handle can be released, and when the slip joint sleeve 36 has been rotated through 90°, the striker angle plate 42 will again fall into the striker angle slot 26, securing the twist lock 18 in the unlocked position shown in FIG. 2.

It is envisioned that the shape of some of the constituent members of the twist lock 18 could be altered within the scope of the present invention. For instance the handle 34 could be attached to the side of the slip joint sleeve 36 rather than the bottom. On the slip joint sleeve 36 itself could be given a square or rectangular, rather than a round, cross-sectional shape.

Inasmuch as the present invention is subject to these as well as many other changes, modifications, and variations in detail, it is intended that all material in the aforegoing description or accompanying drawings be interpreted as illustrative rather than in a limiting sense.

What is claimed is:

1. A chassis lock for locking a trailer chassis to a container body having a locking cavity therein comprising:
    a handle,
    wall means having a striker angle slot defined therein,
    a sleeve fixed to said handle and extending through the striker angle slot,
    a striker angle plate secured to the sleeve and shaped so as to fit into the striker angle slot in at least a first and a second rotatably separated positions,
    a shaft extension carried at one end within the sleeve end and extending at its other end into the cavity in the container body,
    a slip joint connecting the sleeve to the shaft extension, and
    a locking plate of an elongated shape carried by the shaft extension and received within the cavity in the container body such that the container body is secured to the chassis by the locking plate when the sleeve is rotated from the first position wherein the striker angle plate fits into the striker angle slot to the second position.

2. The chassis lock as claimed in claim 1 wherein the slip joint includes a shear pin, the shaft extension having a bore defined therethrough, the sleeve having a pair of elongated slots defined therein, and the shear pin extending through the bore in the shaft extension and through the slots in the sleeve.

3. The chassis lock as claimed in claim 1 wherein the striker angle slot is generally square.

4. The chassis lock as claimed in claim 3 wherein the striker angle plate is bent at approximately a right angle.

5. A chassis lock as claimed in claim 1 wherein the handle is secured to the bottom of the sleeve.

6. A chassis lock as claimed in claim 1 wherein the locking plate has a generally elongated, rectangular shape with the ends of the rectangle being arcuate, inwardly curving surfaces.

7. A chassis lock as claimed in claim 1 wherein a head member is carried on the end of the shaft extension, the head member having the locking plate secured thereto.

8. A chassis lock as claimed in claim 7 wherein the head member has an hour glass shape with two downturned wings and a connecting neck portion, the neck portion being secured to the shaft extension and the wings being secured to the locking plate.

9. A chassis lock as claimed in claim 8 wherein a shear pin block of a cross-sectional shape similar to the locking plate receives the shaft extension therein.

10. A chassis lock for locking a container body to a chassis,
    said chassis and body having vertically alignable openings therein,
    a vertical bolt assembly extending in the locked position through both of said openings,
    said bolt assembly comprising a pair of telescoping upper and lower sections having a lost motion connection therebetween accommodating extension and contraction of said assembly,
    a locking element on said upper portion,
    a locking ledge on said container body,
    said bolt assembly being displaceable upwardly into telescoped relation and to a position elevating said locking element above said ledge and thereupon being rotatable to a position locating said locking element above and in vertical alignment with the ledge whereupon said lower section is adapted to be released and to lower itself gravitationally to an extruded position, and
    detent means on said lower section and said chassis engageable in the extruded position of said lower section and held gravitationally in engagement to prevent rotation of said bolt assembly to unlocking position.

11. The invention according to claim 10 and said lower section being liftable to a position disengaging said detent means whereupon said bolt assembly is rotatable to displace said locking element from said ledge.

12. The invention according to claim 10 and said detent means comprising a striker on said lower section having a locking surface extending axially of the locking bolt,
    and a complimentary surface on said chassis defining a side of said vertical opening therein and engageable with said locking surface on said bolt.

13. The invention according to claim 12 and a generally horizontal upwardly facing surface on said chassis disposed in a position to provide a slidable support for the striker as said bolt is being rotated between locked and unlocked positions.

* * * * *